Dec. 1, 1942.  F. L. MAIN  2,303,699
ACTUATING DEVICE FOR BRAKES AND THE LIKE
Filed March 20, 1939
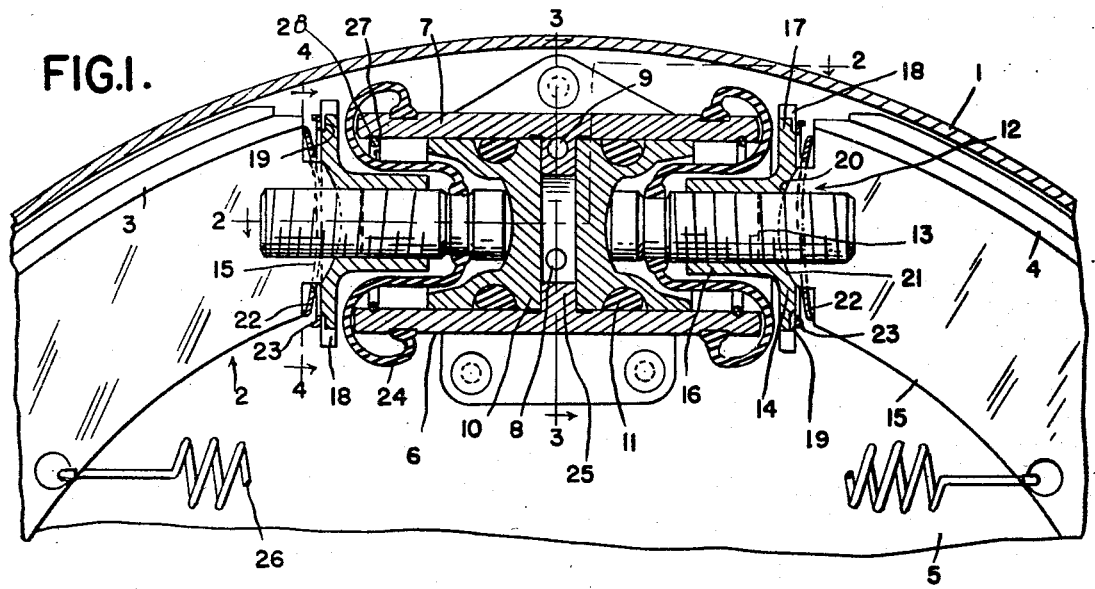
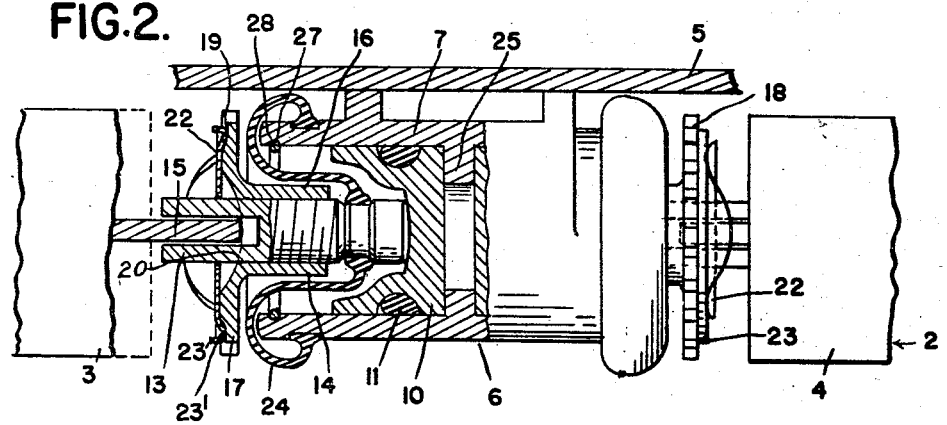
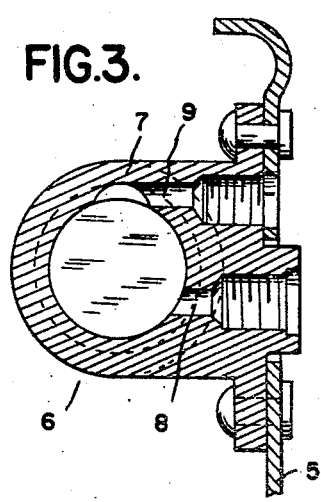
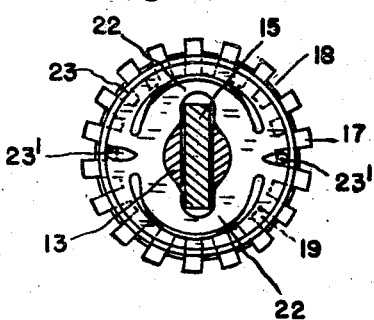
INVENTOR.
FRANK L. MAIN
BY
ATTORNEYS Patented Dec. 1, 1942

2,303,699

UNITED STATES PATENT OFFICE 2,303,699

ACTUATING DEVICE FOR BRAKES AND THE LIKE

Frank L. Main, Birmingham, Mich., assignor to Kelsey-Hayes Wheel Company, Detroit, Mich., a corporation of Delaware Application March 20, 1939, Serial No. 262,961

14 Claims. (Cl. 188—152)

The invention relates to actuating devices for brakes and the like and refers more particularly to hydraulic actuating devices or wheel cylinders for applying brakes.

The invention has for one of its objects to provide an improved actuating device which is substantially foolproof and which is also efficient in operation.

The invention has for other objects to provide an improved connection between a piston of the actuating device and a friction device to be actuated; to form the connection so that it may be readily adjusted; to provide simple means for maintaining the adjustment; and to seal the interior of the cylinder of the actuating device.

The invention has for a further object to construct the actuating device with a single means for limiting the movement toward each other of separated ends of friction device.

These and other objects of the invention will become apparent from the following description, taken in connection with the accompanying drawing, in which Figure 1 is a side elevation, partly in section, of a brake showing an embodiment of my invention;

Figures 2, 3 and 4 are cross sections on the lines 2—2, 3—3 and 4—4 respectively of Figure 1.

The actuating device illustrated in the present instance is a wheel cylinder designed to apply a brake, which comprises the brake drum 1 and the friction device 2. The brake drum is adapted to be secured to a motor vehicle wheel and the friction device comprises the brake shoes 3 and 4 which are movably mounted in a suitable manner upon the backing plate 5 and have separated ends which are adapted to be spread apart to engage the annular flange of the brake drum.

The wheel cylinder for actuating the brake shoes comprises the body 6 located between the separated ends of the brake shoes and mounted upon the backing plate 5. This body is formed with the cylinder 7 having its opposite ends open and also with the passageways 8 and 9 opening into the cylinder and adapted to conduct the brake fluid thereto and to permit the escape of air therefrom, respectively. 10 are opposed pistons slidable within the cylinder and provided with suitable sealing rings 11 in their skirts. For actuating the ends of the brake shoes from the pistons there are the connections or thrust devices 12 between the pistons and the ends.

The connections are alike and each comprises the link 13 and the nut 14. The link has at its inner end a spherically-shaped convex surface to engage a correspondingly shaped concave surface in the head of the associated piston. The outer end of the link is diametrically slotted to form furcations embracing the web 15 of the adjacent brake shoe, this web extending generally at right angles to the axis of the brake shoe and drum. However, the bottom of the slot is located to be spaced at all times from the end of the web. The nut 14 is formed with the sleeve portion 16 which extends within the cylinder 7 and is threaded upon the link 13. The nut also has at the outer end of the sleeve portion the flanged portion 17 which is located beyond the end of the cylinder and is preferably peripherally notched at 18 and formed with the annular series of small recesses 19 in its outer side. The central part of the outer side of the flange portion 17 is formed with the spherically-shaped concave seating surface 20 which is adapted to engage at all times a correspondingly shaped surface upon the convex projection 21 formed at the end of the web 15 and spaced from its radially inner and outer edges. With this construction, each piston upon actuation by brake fluid actuates the associated link which actuates the associated nut. The nut in turn actuates the associated brake shoe. The inner end of each link centers in alignment with the center line of its associated piston and, furthermore, each link provides for radial movement of its associated brake shoe.

To hold each nut from accidental rotation and in its adjusted position, I have provided a one-piece spring stamping between the nut and the end of the associated brake shoe. The spring stamping is apertured to sleeve over the projection 21 and the furcations of the link 13. The stamping is also provided radially inwardly and outwardly from this projection with the spring portions or ears 22 for abutting the portions of the shoe end radially inwardly and outwardly from the projection 21 and with the annular spring portion 23 for abutting the outer side of the nut. The annular portion 23 has the depressions 23' for resiliently engaging the recesses 19. There are preferably two depressions which are diametrically opposite and midway between the ears 22.

It will be seen that the nuts may be readily turned by suitable means, such as a screw driver, inserted through the backing plate and engaging the peripheral notches in the flange portions of the nuts and that at this time the links are held from rotation by reason of their furcations at their outer ends embracing the brake shoe webs. During the rotative adjustment, the spring stampings are held from rotation by the convex projections upon the ends of the brake shoes so that their depressions produce a clicking sound while being forced out of and resiliently snapping back into the recesses in the outer sides of the flange portions of the nuts.

For sealing the interior of the cylinder 7, I have provided the flexible seals 24. These seals are preferably formed of rubber and each has an end portion encircling an end portion of the cylinder and preferably set into an annular groove therein and an end portion located within the cylinder inwardly beyond the adjacent nut and encircling the adjacent link and also preferably engaging in an annular groove in this link.

For the purpose of limiting the movement of the ends of the brake shoes toward each other and also limiting the movement of the pistons toward each other so that especially the passageway 8 will not be closed, I have provided the single flange or wall 25 which extends inwardly into the cylinder 7 at its middle and has portions of both the passageways 8 and 9 formed therein. This flange has a central opening therethrough and it is adapted to be engaged by the inner ends or heads of the pistons while in their retracted position, the retracting having been accomplished through the brake shoes and the intermediate connections under the influence of the retracting spring 26.

To limit the outward movement of the pistons, I have provided the split rings 27 engaging in the internal annular grooves 28 formed in the cylinder 6 at its ends.

What I claim as my invention is:

1. An actuating device for a friction device having separated rounded ends, comprising a cylinder member, pistons extending within said cylinder member, and a member adjustably operatively connected to each of said pistons and having a concave rounded bearing surface engageable with the adjacent rounded end of said friction device to center the latter relative to the adjustable member.

2. An actuating device for a friction device having separated rounded ends, comprising a cylinder member, pistons extending within said cylinder member, a link operatively connected to each of said pistons, and a member adjustably connected to each of said links and having a concave rounded bearing surface engageable with the adjacent rounded end of said friction device.

3. An actuating device for a friction device having separated ends, one of which is rounded, said actuating device comprising a cylinder member, a piston extending within said cylinder member, and a member operatively connected to said piston and having a concave rounded bearing surface engageable with said rounded end to center the latter end of the friction device relative to said last named member.

4. An actuating device for a friction device having separated ends, one of which is rounded, said actuating device comprising a cylinder member, a piston extending within said cylinder member, a member adjustably operatively connected to said piston, comprising a concave rounded bearing surface engageable with said rounded end to center the latter end of the friction device relative to said adjustable member, and means for normally holding said member in its adjusted position.

5. An actuating device for a friction device having separated ends, one of which is rounded, said actuating device comprising a cylinder member, a piston extending within said cylinder member, a link operatively connected to said piston, a nut adjustably threaded upon said link and having a concave surface engaging said rounded end to center the latter end of the friction device relative to the nut, and a resilient member engageable with said nut to hold the same in its adjusted position.

6. An actuating device for a friction device having separated ends, comprising a cylinder member, a piston extending within said cylinder member, a link operatively connected to said piston, a nut adjustably threaded upon said link and having a bearing surface engageable with the adjacent end of said friction device, and a resilient member between said nut and the adjacent end of said friction device for holding said nut in its adjusted position.

7. An actuating device for a friction device having separated ends, each of said ends having a web extending generally at a right angle to the axis of said friction device and formed with a convex projection spaced from the radially inner and outer edges of said web, said actuating device comprising a cylinder member, pistons extending within said cylinder member, links bearing upon said pistons and embracing said convex projections, nuts having portions beyond said cylinder member formed with concave bearing surfaces engaging said projections and having sleeve portions extending within said cylinder and threaded upon said links, and resilient means sleeved over said projections and abutting the portions of said ends radially inwardly and outwardly of said projections and also said nuts for normally holding said nuts from rotation.

8. An actuating device for a friction device having an end adapted to be actuated, said actuating device comprising a link held from rotation by the friction device, a rotatable nut threaded upon said link and bearing upon said end, and a resilient member held from rotation by the friction device and having resilient portions engaging said end and nut, said member normally holding said nut from rotation.

9. An actuating device for a friction device having separated ends, comprising a cylinder member, a piston extending within said cylinder member, a link operatively connected to said piston, a nut extending within said cylinder member and adjustably mounted on said link and operatively connected to one of said ends, and a flexible seal encircling and secured at one end to said link within said cylinder member beyond said nut and encircling and secured at the other end to said cylinder member.

10. An actuating device for a friction device having an end adapted to be actuated, comprising a cylinder, a piston reciprocable within said cylinder, a link operatively connected to said piston, an adjusting nut threaded on said link and bearing upon the end of said friction device, and a flexible seal having a portion engaging said link intermediate the piston and the adjusting nut and another portion engaging said cylinder.

11. An actuating device for a friction device having an end adapted to be actuated, comprising a link held from rotation by the friction device, an adjusting nut threaded upon said link and bearing upon the end of the friction device, and an annular member encircling said link intermediate said nut and the end of the friction device, said annular member having a resilient portion engaging said nut and another resilient portion engaging the end of the friction device, said member normally holding said nut from rotation.

12. An actuating device for a friction device having an end adapted to be actuated, comprising a link held from rotation by the friction device, an adjusting member threaded upon said link and bearing upon the end of the friction device, a resilient member held from rotation by the friction device and having resilient portions engaging the adjusting member and the end of the friction device, and cooperating means upon said adjusting member and said resilient member adapted to normally hold said adjusting member in one of a plurality of spaced angular positions.

13. An actuating device for a friction device having separated ends, one of said ends being rounded, said actuating device comprising a cylinder member, a piston extending within said cylinder member, a link having one end rockably engaging said piston, and a nut adjustably mounted on the link for movement axially of the latter and having a concave surface engaging the rounded end aforesaid of the friction device for centering the latter relative to the nut.

14. An actuating device for a friction device having separated ends, one of which is rounded, said actuating device comprising a cylinder member, a piston extending within said cylinder member, a link having one end rockably engaging said piston and having a bifurcated portion at the opposite end arranged with the furcations extending at opposite sides of the rounded end of the friction device, and a nut adjustably threaded upon said link and having a concave surface engaging the rounded end aforesaid of the friction device for centering the latter relative to the nut.

FRANK L. MAIN.